United States Patent Office 2,891,972
Patented June 23, 1959

2,891,972

PROCESS OF SEPARATING DESOXYCHOLIC ACID FROM MIXED CRUDE BILE ACIDS OR SALTS THEREOF

Laurene O. Paterson, Adrian, Mich., assignor to Drug Research, Inc., Adrian, Mich., a corporation of Michigan No Drawing. Application August 19, 1952
Serial No. 305,283

20 Claims. (Cl. 260—397.1)

This invention relates to a process of separating desoxycholic acid from mixed crude bile acids or salts thereof. This application is a continuation-in-part of my application Serial No. 190,674, filed October 18, 1950 (now abandoned), which in turn is a continuation-in-part of my application Serial No. 131,500, filed December 6, 1949 (now abandoned).

It is well known that derivatives of cholic acid and desoxycholic acid are found in animal bile. Bile also has a rather high fat and pigment content. For example, beef bile solids contain around 40% to 45% of conjugated salts of cholic acid, namely, sodium taurocholate and sodium glycocholate. The desoxycholic acid content of beef bile solids may range between 4% and 21% with the average being 11% to 12%. The desoxycholic acid is also present as conjugated salts, such as sodium tauro-desoxycholate and sodium glycodesoxycholate.

In order to liberate desoxycholic acid and cholic acid from the amino acids, the bile is subjected to alkaline hydrolysis followed by acid precipitation whereby one obtains solid mixed crude bile acids containing cholic acid, desoxycholic acid in the form of desoxycholic acid-fatty acid complexes, fatty acids and pigments. Several processes have been proposed in the past for recovering substantially pure cholic acid as a valuable and desired product from mixed crude bile acids. However, desoxycholic acid has recently become valuable in the synthesis of cortisone and this invention has for an object the provision of a method of readily separating desoxycholic acid from mixed crude bile acids in a form substantially free of cholic acid and pigments and containing only minor amounts of complexed fatty acid and solvent.

A further object of this invention is the provision of a separation and purification process of the character indicated which is easy to carry out with a minimum of equipment.

A still further object of this invention is the provision of a process for obtaining desoxycholic acid of acceptable purity and in high yields from mixed crude bile acids.

Further and additional objects will appear from the following description and the appended claims.

In the past various processes have been proposed for separating desoxycholic acid from the cholic acid contained in mixed crude bile acids. The methods that have been proposed are those involving alcholic extractions, the formation of insoluble desoxycholic acid-acetic acid complexes in acetic acid solution, and the precipitation of the insoluble barium or magnesium desoxycholates. However, all of these previously proposed processes result in low yields of desoxycholic acid and are exceedingly cumbersome to carry out on a commercial scale.

The process of this invention is particularly advantageous for commercial operation and is adaptable to the nearly quantitative separation of desoxycholic acid from mixed crude bile acids. This process is an improvement over the prior art in that (1) the desoxycholic acid is the first to be removed from the mixed crude bile acids and during this removal step it is almost completely separated from the pigments and also most of the fatty acids and cholic acid, thereby facilitating further purification, (2) no metallic impurities are introduced into the process which may present problems of separation from the final product, and (3) the residual cholic acid can be readily purified since it has been freed of desoxycholic acid.

It is well recognized that it is difficult to separate cholic acid from desoxycholic acid, particularly as they naturally occur in saponified bile, because the physical and chemical properties of these compounds are very similar. Both are insoluble in water and have similarly soluble salts. The ionization constants of these two acids are almost identical. However, it has been known that desoxycholic acid differs from cholic acid in that it has a marked tendency to form molecular complexes. This is especially true with the fatty acids of the character normally found in mixed crude bile acids but similar complexes have been described with xylene and toluene. In accordance with this invention it has now been discovered that the ionization constants of the aforementioned desoxycholic acid complexes are sufficiently lower than the ionization constant of cholic acid to provide a means for separating the cholic acid from the desoxycholic acid. There is a sufficiently high concentration of higher fatty acids in mixed crude bile acids to permit the desired complexes to form. To complement and enhance the complex formation toluene or xylene may be added.

Thus cholic acid which does not have a tendency to form fatty acid or other complexes is sufficiently stronger as an acid than the desoxycholic acid complexes so that in accordance with one embodiment of this invention cholic acid may be preferentially dissolved along with the pigments and the bulk of the fatty acids at a pH lower than that which will permit the dissolution of the desoxycholic acid complexes. For example, a method of separation may be carried out by the careful addition of an acid to an aqueous solution of the salts of mixed crude bile acids to preferentially precipitate the desoxycholic acid complexes leaving cholic acid, pigments and the bulk of the fatty acids in solution whereafter the precipitate is separated from the mother liquor. Preferably, however, and conversely, the separation may be effected by selectively dissolving the cholic acid, the pigments and the fatty acids contained in an aqueous slurry of mixed crude bile acids by the addition of just sufficient base to effect the desired solution and under the conditions more fully hereinafter pointed out. In accordance with this preferred process the amount of base used is far in excess of that used in the prior art because in the process of this invention sufficient base is required to dissolve subtantially all the fatty acids, pigments and the bulk of the cholic acid. For example, the processes disclosed in Fosbinder Patent No. 2,228,596 and in Peyer Patent No. 1,861,319 do not result in any separation of desoxycholic acid from cholic acid because insufficient base is added in the processes of these patents to dissolve the bulk of the cholic acid. In the procedures disclosed in these patents the fatty acids and the pigments are removed from a cholic acid-desoxycholic acid mixture but these patentees did not attempt nor accomplish any separation of the desoxycholic acid from the cholic acid as disclosed by the present invention.

I have discovered that when a rapidly agitated aqueous suspension of crude mixed bile acids is treated with a base the pH rises and is buffered at approximately pH 6.0 to 6.2 until substantially all the cholic acid, the fats and pigments are dissolved. With the continued addition of base the pH begins to rise and when a pH of 6.8 to 7.0 is reached the desoxycholic acid is also completely dissolved. Thus in accordance with this invention it has been found that an aqueous slurry of mixed crude bile acids or an aqueous solution of the salts thereof may be treated to adjust the hydrogen ion concentration to a pH value between 6.0 and 6.2, an amount of base or acid being used so that the cholic acid, fatty acids and pigments will go into or remain substantially in solution, and the fraction containing the desoxycholic acid (presumably as the fatty acid complex thereof) will remain undissolved or preferentially precipitate from solution. If such a solvent as toluene or xylene is added to the extraction medium, the pH values are in no way affected but the resulting desoxycholic acid fraction occurs as a mixed complex of fatty acids and the solvent.

In the adaptation of the present invention to a mixture of crude bile acids, it is preferred to add to an aqueous slurry of the acids an alkali in an amount just sufficient to dissolve all the crude bile acids (including the cholic acid, desoxycholic acid complexes, fatty acids and pigments) under reflux conditions and at the same time to raise the pH value to between 6.0 and 6.2. The mixture is then heated to reflux temperatures, preferably but not necessarily in the presence of toluene, whereby substantially complete solution is effected. Upon subsequent cooling, the desoxycholic acid complexes preferentially precipitate and the crude desoxycholic acid-containing precipitate is separated from the mother liquor containing the bulk of the cholic acid, fatty acids and pigments. In this preliminary separation step the amount of base employed is adjusted so that a minor percentage of cholic acid will precipitate along with the desoxycholic acid upon cooling. This is desirable as a safety factor to make it a certainty that all of the desoxycholic acid complex has been precipitated.

In the process indicated in the preceding paragraph, any base having a dissociation constant of greater than $1 \times 10^{-8}$ may be used. However, it is preferred to employ an organic or inorganic base having a dissociation constant of between about $1 \times 10^{-5}$ and $1 \times 10^{-8}$ since by using relatively weak bases the critical pH of between 6.0 and 6.2 may be more easily and accurately controlled in commercial operations. Suitably relatively weak bases that may be used for the process are sodium bicarbonate, ammonia, morpholine, triethanolamine, 2-amino-2-methyl-1-propanol, ethyl amine and methylamine. Generally speaking, it is not desirable to employ basic compounds of barium or magnesium since these compounds have a tendency to form undesirable insoluble precipitates with desoxycholic acid or the complexes thereof which may complicate the purification procedure.

It will be understood from the foregoing that the proper amount of base employed in the process is dependent upon the particular composition of the mixed crude bile acids employed as a starting material. However, this amount may be determined for any particular batch by adding to an aqueous suspension of the mixed crude bile acids just that amount of base which will cause substantially complete solution of the mass upon boiling. This solution will be found to have a pH between 6.0 and 6.2. When this solution is cooled it will be found that the desoxycholic complexes precipitate along with a minor amount of cholic acid while the bulk of the cholic acid, pigments and fatty acids remain in solution. The precipitate containing a major proportion of desoxycholic acid complexes and a minor proportion of cholic acid is separated and may be purified as hereinafter described.

As above suggested, the process is also applicable to the water-soluble salts of mixed crude bile acids in which the pH is carefully adjusted downwardly by adding a suitable acid. In such a process the aqueous solution of salts, initially having a pH well above 6.2, is treated with an acid, the amount of such acid being that which will just produce a distinct haze in the solution while it is under reflux conditions and will lower the pH to between about 6.0 and about 6.2. After the acid treatment the solution is heated or refluxed and then cooled. The desoxycholic acid-fatty acid complex precipitates along with a minor proportion of the cholic acid and the bulk of the cholic acid, pigments and fatty acids remain in solution. Toluene may be added to the solution of crude bile acid salts before the addition of the acid. In this event a mixed complex of desoxycholic acid-fatty acid and desoxycholic acid-toluene is obtained. The resulting mass is then filtered or centrifuged to separate the crude desoxycholic acid-containing fraction. As indicated, in the separation of the desoxycholic acid-complex fraction by either of the above methods, it is preferred to adjust the amount of the acid or alkali added so that a minor amount of cholic acid also precipitates along with the complex which may thereafter be separated. Thus in commercial practice utilizing mixed crude bile acids from beef bile, the first crude desoxycholic acid complex precipitated comprises solids of which 80% may be the desoxycholic acid complex and about 20% may be cholic acid. By operating in this manner one can always be sure that substantially all the desoxycholic acid has been separated the first time. Inasmuch as the bulk of the uncomplexed fatty acids and the pigments remain dissolved, no complications arise in the subsequent purification of the desoxycholic acid-enriched fraction.

The minor amount of cholic acid in the crude desoxycholic complex fraction can be readily separated by use of a comparatively small amount of a weak base such as sodium bicarbonate in order selectively to dissolve the cholic acid. However, in accordance with one embodiment of this invention, it is contemplated to utilize a volatile nitrogenous base, such as ammonia, methyl amine or ethyl amine, for this purpose. Thus it has been discovered that cholic acid is a sufficiently strong acid to form a salt with such volatile base, which salt, when in solution, will not liberate the volatile base when the solution is heated to boiling. However, the relatively weak desoxycholic acid-fatty acid complex salt of volatile bases will liberate the base upon boiling, thereby resulting in a precipitable desoxycholic acid complex. Thus if an aqueous slurry of a mixture of cholic acid and desoxycholic acid-fatty acid complex is treated with a volatile nitrogenous base, such as ammonia, methyl amine or ethyl amine, the soluble salts are formed. The mixture is then boiled to drive off the volatile base and upon cooling, the salt of the cholic acid remains in solution and the desoxycholic acid-fatty acid complex precipitates in a pure form and may be separated.

For a more complete understanding of this invention, reference will now be made to a specific method for separating desoxycholic acid and cholic acid from mixed crude bile acids.

*Saponification of bile—Step 1*

One hundred pounds of concentrated beef bile containing about 75 pounds of bile solids are diluted to about 45 gallons with 10% sodium hydroxide solution and maintained at boiling temperatures for 18 to 24 hours in order to effect saponification. The bile solids have an equivalent cholic acid content of about 45% and an equivalent desoxycholic acid content of about 11% or 12%. It will, of course, be apparent that the cholic and desoxycholic acid contents of bile may differ depending upon the particular source material.

*The preparation of mixed crude bile acids—Step 2*

The hot saponified mass is cooled to about 150° F. and treated with hydrochloric acid, sulfuric acid or other suitable acid to adjust the hydrogen ion concentration of the solution to a pH value of about 8.5. The pH at this point is not critical, however, so long as the crude bile acids are not precipitated. A filter-aid is added to the acidified saponified mass and the resulting suspension is filtered in order to remove gross impurities. After filtration the filtrate is further acidified with hydrochloric, sulfuric or other acid to adjust the hydrogen ion concentration to a pH between about 3.5 and about 4.0 in order to precipitate the mixed crude bile acids, including all of the cholic acid and desoxycholic acid or fatty acid complex thereof that may be present. The precipitate is removed as by filtering or centrifuging.

The solids separated by this step are the crude mixed bile acids containing cholic acid, desoxycholic acid or the fatty acid complexes thereof, higher fatty acids and pigments. This composition provides the source material from which the cholic acid and the desoxycholic acid are separated in accordance with this invention.

First separation of desoxycholic acid—Step 3

To 650 pounds of water are added, with stirring, 100 pounds (dry basis) of the mixed crude bile acids prepared as above indicated in Step 2. The suspension is heated to boiling and 3 gallons of toluene and 12 pounds of morpholine are added, the amount of morpholine having been predetermined in the manner previously indicated, it being that amount which will just dissolve substantially all of the mixed crude bile acids upon boiling and which will effect the adjustment of the pH to a value between about 6.0 and 6.2. The mixture is refluxed for two hours and substantially all the crude bile acids go into solution. Thereafter the mass is allowed to cool with continued agitation and is then allowed to stand at room temperature for about 18 hours. The desoxycholic acid complexes precipitate preferentially during the cooling along with a minor proportion of cholic acid. The precipitate is separated from the mother liquor by filtering, centrifuging or other mechanical means. The filter cake is washed by water.

The crude desoxycholic acid fraction is then removed from the filter press and set aside for subsequent purification, hereinafter to be described. The bulk of the cholic acid, the fatty acids and pigments are contained in the mother liquor which may be treated to separate cholic acid in the pure state as hereinafter described.

In this step of the process morpholine is specifically referred to as the base for treating the mixed crude bile acids and it is preferred because of ease in handling. However, other bases preferably having dissociation constants of between $1 \times 10^{-5}$ and $1 \times 10^{-8}$ could be satisfactorily employed, suitable bases being ammonia, methyl amine, ethyl amine, ethanolamine, sodium bicarbonate and the like. The amount of morpholine or other base to be added was predetermined, as previously indicated, by being that amount which will just substantially dissolve the mixed crude bile acid at refluxing temperatures and to bring the hydrogen ion concentration of the mixture to a value corresponding to a pH between about 6.0 and about 6.2. This pH adjustment permits a separation of the desoxycholic acid complexes by preferential precipitation from the solution when it is cooled. It is desirable to avoid the addition of an amount of base in excess of that indicated since otherwise a portion of the desoxycholic acid complex may not precipitate. In order to be on the safe side and in order to insure that all of the desoxycholic acid complex precipitates, the amount of base that is added is usually just a trifle less than that required for complete solution of the mixed crude bile acids at reflux temperatures. By this procedure some of the cholic acid will precipitate along with the desoxycholic acid upon cooling. However, this is not objectionable since the cholic acid may be easily separated from the desoxycholic acid complex.

Preparation of crude cholic acid—Step 4

The filtrate from the previous Step 3 containing the bulk of the cholic acid has only a very small amount of desoxycholic acid in it. To the combined filtrate and wash liquid is added an acid to adjust the pH below about 5.4 and preferably between 3.0 and 3.5 in order to precipitate the cholic acid together with some impurities. This precipitate is a granular mass which is dark brown in color. It is separated from the mother liquor by filtering or centrifuging and the filtrate is discarded. The precipitate is washed with hot water to remove some of the fatty acids which may be discarded and the crude cholic acid precipitate is set aside for further purification.

Purification of crude desoxycholic acid—Step 5

The crude desoxycholic acid fraction prepared as indicated above in Step 3 in the amount of 20 pounds (dry basis) is placed in a still to which 20 pounds of soft water are added. In calculating the total water to be added, the amount of water present in the crude complex should be taken into consideration. It is preferred to use soft water free of magnesium salts since the magnesium ion has a tendency to form an insoluble magnesium salt with the desoxycholic acid. Also added to the still are 20 pounds of isopropyl alcohol or other water-miscible solvent which is also a solvent for the bile acids together with 0.4 pound sodium bicarbonate. The mixture is heated to boiling under reflux conditions for about ½ hour whereby the cholic acid and any residual pigments and surplus fats or fatty acids not previously complexed with the desoxycholic acid are extracted. Thereafter the mixture is cooled to about room temperature with agitation and the substantially pure desoxycholic acid complex is separated by centrifuging or filtration. This purified desoxycholic acid complex is white in color, has a melting point of 174° to 176° C., and shows only very small amounts of cholic acid upon analysis. It contains small percentages of fatty acid and combined toluene.

In this step of the process the sodium bicarbonate serves to preferentially dissolve and retain in solution upon cooling the stronger acid, cholic acid. Obviously the amount of the bicarbonate or similar weak base to be employed in this step will depend upon the concentration of the cholic acid in the crude desoxycholic acid fraction. It is also preferred to use in this extraction, in conjunction with the weak base, a quantity of a water-miscible solvent such as isopropyl alcohol. The solvent selected should also be a solvent for the bile acids so that in heating to reflux temperatures partial solution of the desoxycholic acid fraction occurs. Upon cooling preferential deposition of the less soluble desoxycholic acid complex will take place. In the place of isopropyl alcohol other water miscible solvents, such as methyl alcohol, ethyl alcohol, acetone, normal propyl alcohol, ethylene glycol, methyl ethyl ketone and the like may be used. Alkaline-reacting agents other than sodium bicarbonate may be used to remove the cholic acid. However, it is preferred that the alkaline agent should have an ionization constant greater than $1 \times 10^{-8}$ and enough of the alkaline material should be used to dissolve the cholic acid but leave substantially all the desoxycholic acid complex in suspension upon final cooling.

The purified desoxycholic acid complex produced by this step constitutes one of the principal products of the process. It may be dried at about 165° C., packed in fiber drums and shipped in the usual manner. The desoxycholic acid complex has a marked tendency to retain solvents which, if desired, may be removed at a higher temperature under vacuum.

The filtrate or extract liquid from this step in the process contains substantial quantities of cholic acid as well as some desoxycholic acid complex. In commercial operations it is preferred to recycle this liquid to the initial mixed crude bile acids produced in Step 2 in order to recover these valuables.

Alternate procedure for purifying desoxycholic acid—alternate Step 5a

As indicated above, the first crude desoxycholic acid fraction of Step 3 containing substantial amounts of cholic acid may be purified, if desired, by the use of volatile nitrogenous bases, such as ammonia, methyl amine, ethyl amine and the like. In accordance with this alternative procedure, 20 pounds of crude desoxycholic acid complex containing about 20% cholic acid are dissolved in aqueous ammonia to make a 10% solution. The amount of ammonia in the solution is in excess of that which is required to dissolve all of the cholic acid and the desoxycholic acid complex. Thereafter the mixture is boiled for a few minutes to effect solution, filtered while hot to remove impurities and the filtrate then concentrated by boiling. During the boiling step the excess ammonia is driven off and the ammonium salt of the desoxycholic acid complex is decomposed to liberate the free acid complex which precipitates to form a heavy slurry. This mixture is cooled and the desoxycholic acid complex is filtered off or otherwise separated. The resulting product is white in color, has a melting point of 187°–189° C. and is substantially free from cholic acid. The filtrate which contains the ammonium salt of cholic acid in addition to some desoxycholic acid complex may be added to succeeding batches of mixed crude bile acids by way of recycle.

*Alternate procedure for the initial precipitation of desoxycholic acid from mixed crude bile acids— alternate Step 3a*

The hot saponified crude bile acid solution is adjusted to a pH of 8.5 and filtered (see Step 2). One gallon of toluene is added and with rapid agitation and under reflux conditions this mixture is treated with 25% acetic acid solution to cause a distinct haze to be formed with the simultaneous adjustment of the pH of the solution to a value of 6.0 to 6.2. The solution is then allowed to cool with agitation and stand for 18 hours. The resulting crude desoxycholic acid complexes are removed by filtration or centrifuging. This crude desoxycholic acid fraction may be further purified as described above.

It will be noted that in the practice of this process the desoxycholic acid appears to be separated as a fatty acid-toluene complex. However, the complex contains only a small percentage of fatty acid or solvent and may be used in many syntheses without further purification.

It is emphasized that this invention is not restricted to the use of any particular class of acids or bases that may be employed for the adjustment of the pH values. The invention in one phase is directed to a critical adjustment of pH within a range of 6.0 to 6.2. As previously indicated, it is preferred that the bases which may be used are those having dissociation constants between $1 \times 10^{-5}$ and $1 \times 10^{-8}$. However those volatile nitrogenous bases represented by ammonia and the amines may preferably have dissociation constants ranging between $1 \times 10^{-4}$ and $1 \times 10^{-8}$.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A process of separating desoxycholic acid in complex form from cholic acid contained in a substance selected from the group consisting of mixed crude bile acids mixtures of desoxycholic acid complex and cholic acid, and the salts thereof which comprises adjusting the hydrogen ion concentration of an aqueous mixture of said substance to a range corresponding to between about pH 6.0 and about pH 6.2, heating the resulting mixture to an elevated temperature while maintaining the hydrogen ion concentration within said range whereby at least partial solution of said substance including substantially all of the cholic acid is effected, and then cooling the resulting mass while maintaining the hydrogen ion concentration within said range whereby a desoxycholic acid complex fraction is preferentially precipitated, and separating the resulting precipitate.

2. A process of separating desoxycholic acid in complex form from mixed crude bile acids which comprises treating the mixed crude bile acids with water and a base, the amount of said base being just sufficient to substantially dissolve the mixed crude bile acids under reflux conditions and to impart to the mixture a hydrogen ion concentration corresponding to a value in the range between about pH 6.0 and about 6.2, heating the resulting mixture to dissolve substantially all of the mixed crude bile acids while maintaining said value within said range, cooling the resulting mixture while continuing to maintain said value within said range whereby a desoxycholic acid complex-containing fraction precipitates, and separating the resulting precipitate.

3. A process of separating desoxycholic acid in complex form from mixed crude bile acids which comprises treating the mixed crude bile acids with water and a base having a dissociation constant between about $1 \times 10^{-5}$ and about $1 \times 10^{-8}$, the amount of said base being just sufficient to permit substantially complete solution of the mixed crude bile acids under reflux conditions and to impart to the resulting mixture a hydrogen ion concentration corresponding to a value in the range between about pH 6.0 and 6.2, refluxing the resulting mixture while maintaining said value within said range to dissolve substantially all of the mixed crude bile acids, cooling the resulting solution while continuing to maintain said value within said range whereby a desoxycholic acid complex-containing fraction precipitates, and separating the resulting precipitate.

4. A process of separating desoxycholic acid in complex form from cholic acid contained in mixed crude bile acid salts which comprises adding to an aqueous solution of said salts having an initial pH greater than 6.2 an acid in an amount to adjust the hydrogen ion concentration to a value in the range corresponding to between about pH 6.0 and 6.2, heating the resulting mixture while maintaining said value within said range to an elevated temperature, thereafter cooling the mixture while continuing to maintain said value within said range whereby a desoxycholic acid complex-containing fraction precipitates, and separating the resulting precipitate.

5. A process of separating desoxycholic acid in complex form from cholic acid contained in mixed crude bile acid salts which comprises adding to an aqueous solution of said salts having an initial pH greater than 6.2 an acid in an amount sufficient to adjust the hydrogen ion concentration of the solution to a value in the range of between about 6.0 and 6.2 and to just initiate the formation of a precipitate under reflux conditions, refluxing the resulting mixture while maintaining said value within said range, thereafter cooling the mixture while continuing to maintain said value within said range whereby a desoxycholic acid complex-containing fraction precipitates, and separating the resulting precipitate.

6. A process of separating desoxycholic acid in complex form from mixed crude bile acids which comprises treating the mixed crude bile acids with water and a base, the amount of said base being just sufficient to substantially dissolve the mixed crude bile acids under reflux conditions and to impart to the mixture a hydrogen ion concentration corresponding to a value within the range between about pH 6.0 and about 6.2, heating the resulting mixture while maintaining the value within said range until substantially all of the mixed crude bile acids are dissolved, cooling the resulting mixture while continuing to maintain said value within said range whereby a desoxycholic acid complex-containing fraction precipitates, separating the resulting precipitate from the mother liquor, resuspending said resulting precipitate in water in the presence of an alkaline buffering agent, heating the resulting suspension and thereafter cooling whereby cholic acid and other impurities are dissolved and a purified solid desoxycholic acid complex remains in suspension, and separating said purified desoxycholic acid complex.

7. A process of separating desoxycholic acid in complex form from mixed crude bile acids which comprises treating the mixed crude bile acids with water and a base, the amount of said base being just sufficient to substantially dissolve the mixed crude bile acids under reflux conditions and to impart to the mixture a hydrogen ion concentration corresponding to a value within the range between about pH 6.0 and about 6.2, heating the resulting mixture while maintaining the value within said range until substantially all of the mixed crude bile acids are dissolved, cooling the resulting mixture while continuing to maintain said value within said range whereby a desoxycholic acid complex-containing fraction precipitates, separating the resulting precipitate from the mother liquor, dissolving said resulting precipitate in an aqueous solution of a volatile nitrogenous base, the amount of said base being at least sufficient to cause substantially complete solution of the precipitate upon boiling, thereafter boiling free base from the resulting solution and cooling whereby to precipitate a purified desoxycholic acid complex-containing fraction, and separating said precipitated fraction from the solution containing a soluble nitrogenous salt of cholic acid.

8. In a process of separating desoxycholic acid in complex form from crude mixed bile acids, the step of treating a solid comprising essentially a mixture of a desoxycholic acid complex and cholic acid with an aqueous solution of a volatile nitrogenous base, the amount of said base being in excess of that amount sufficient to cause substantially complete solution of the cholic acid upon boiling, thereafter boiling free base from the resulting solution and cooling whereby to precipitate the desoxycholic acid-fatty acid complex, and separating said precipitated complex from the solution containing a soluble nitrogenous salt of cholic acid.

9. The process recited in claim 8 wherein said nitrogenous base is selected from the group consisting of ammonia and a volatile alkyl amine.

10. The process recited in claim 8 wherein said nitrogenous base is ammonia.

11. In a process for separating desoxycholic acid in complex form from cholic acid contained in a substance selected from the group consisting of mixed crude bile acids, mixtures of desoxycholic acid complex and cholic acid, and the salts thereof, the steps of adjusting the hydrogen ion concentration of an aqueous dispersion of said substance to a value within the range of between about pH 6.0 and about pH 6.2, maintaining the pH of said dispersion within said range until the bulk of the cholic acid is in aqueous solution and the bulk of the desoxycholic acid is in the form of a suspended solid, and separating said solid from said solution.

12. In a process for separating desoxycholic acid in complex form from cholic acid contained in mixed crude bile acids, the step of treating said mixed crude bile acids with water and a sufficient amount of a base to raise the pH of the resulting dispersion to between about 6.0 and about 6.2, maintaining the pH of the dispersion within the range above specified until the bulk of the cholic acid goes into solution and the bulk of the desoxycholic acid is in the form of a suspended solid, and then separating the solid from said dispersion.

13. In a process for separating desoxycholic acid in complex form from cholic acid contained in a substance selected from the group consisting of mixed crude bile acids, mixtures of desoxycholic acid complex and cholic acid, and the water soluble salts thereof, the steps of adjusting the hydrogen ion concentration of an aqueous dispersion of said substance to a value within a range in which the cholic acid is solubilizable therein and the desoxycholic acid associated with said substance is insolubilizable therein, maintaining the hydrogen ion concentration of said dispersion within said range until the bulk of the cholic acid is in solution and the bulk of the desoxycholic acid is in the form of an undissolved suspended solid, and separating said solid from said solution.

14. A process for separating desoxycholic acid in complex form from an aqueous solution of salts of mixed crude bile acids which comprises adding an acid to said solution in an amount which approximates the amount just required to produce a distinct haze in said solution when heated to boiling, maintaining the pH of said acidified solution against further substantial change until the bulk of the desoxycholic acid precipitates, and at a temperature below boiling separating the precipitated desoxycholic acid complex from the resulting solution.

15. A process of separating desoxycholic acid in complex form from an aqueous suspension of mixed crude bile acids which comprises adding a base to said substance in an amount which approximates the amount just required to solubilize substantially all the mixed crude bile acids when heated to boiling, maintaining the pH against further change while the bulk of the cholic acid is being solubilized, and at a temperature below boiling separating the resulting solution containing dissolved cholic acid from an unsolubilized solid containing a substantial amount of said desoxycholic acid complex.

16. The process recited in claim 3 wherein said base is morpholine.

17. The process recited in claim 15 wherein said base is morpholine.

18. In a process for separating desoxycholic acid from an aqueous alkaline solution of cholic and desoxycholic acids in which a non-polar volatile organic substance is added to form a coordination compound with the desoxycholic acid in the solution, the steps of acidifying the mixture until crystallization of the desoxycholic coordination compound begins, maintaining the pH against further substantial drop until the bulk of the desoxycholic acid crystallizes, and separating the crystallized desoxycholic acid.

19. In a process for separating desoxycholic acid from an aqueous alkaline solution of cholic and desoxycholic acids in which a non-polar volatile organic substance is added to form a coordination compound with the desoxycholic acid in the solution, the steps of acidifying the mixture until crystallization of the desoxycholic coordination compound begins, continuing the addition of acid until an equilibrium of the pH is established and until the pH is from about .1 to about .2 below the equilibrium level, and separating the resulting crystallized desoxycholic acid.

20. In a process for separating desoxycholic acid from an aqueous alkaline solution of cholic and desoxycholic acids in which a non-polar, volatile organic substance is added to form a coordination compound with the desoxycholic acid in the solution, the steps of acidifying the mixture until crystallization of the desoxycholic coordination compound begins, continuing the acidification until an equilibrium pH is established, and then maintaining the pH slightly below said equilibrium pH to effect crystallization of the desoxycholic acid and separating the desoxycholic acid crystals.

References Cited in the file of this patent

UNITED STATES PATENTS

| | | |
|---|---|---|
| 2,331,574 | Sifferd et al. | Oct. 12, 1943 |
| 2,661,356 | Sifferd | Dec. 1, 1953 |

FOREIGN PATENTS

| | | |
|---|---|---|
| 105,769 | Great Britain | Dec. 11, 1919 |

OTHER REFERENCES

Chemical Abstracts, volume 27, page 5350 (1933).
Natural Products Related to Phenanthrene, Fieser and Fieser, 3rd edition, 1949, pages 115–118.

UNITED STATES PATENT OFFICE

CERTIFICATE OF CORRECTION

Patent No. 2,891,972                                                June 23, 1959

Laurene O. Paterson

It is hereby certified that error appears in the printed specification of the above numbered patent requiring correction and that the said Letters Patent should read as corrected below.

Column 7, line 63, claim 1, after "acids" insert a comma.

Signed and sealed this 8th day of March 1960.

(SEAL)
Attest:

KARL H. AXLINE
Attesting Officer

ROBERT C. WATSON
Commissioner of Patents